United States Patent
Wang et al.

(10) Patent No.: US 10,211,751 B2
(45) Date of Patent: Feb. 19, 2019

(54) NON-POLAR RECTIFYING CIRCUIT

(71) Applicants: Self Electronics Co., Ltd., Ningbo, Zhejiang (CN); Wanjiong Lin, Zhejiang (CN); Self electronics USA Corporation, Norcross, GA (US)

(72) Inventors: Zhiming Wang, Zhejiang (CN); Xuhong Ma, Zhejiang (CN); Junjun Ying, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/380,739

(22) Filed: Dec. 15, 2016

(65) Prior Publication Data

US 2017/0194875 A1   Jul. 6, 2017

(30) Foreign Application Priority Data

Dec. 31, 2015   (CN) .......................... 2015 1 1029418

(51) Int. Cl.
   *H02M 7/219*   (2006.01)
   *H02M 1/08*    (2006.01)

(52) U.S. Cl.
   CPC ........... *H02M 7/219* (2013.01); *H02M 1/083* (2013.01); *H02M 2007/2195* (2013.01); *Y02B 70/1408* (2013.01)

(58) Field of Classification Search
   CPC ...................... H02M 2007/2195; H02M 7/219
   See application file for complete search history.

(56) References Cited

U.S. PATENT DOCUMENTS

| | | | | |
|---|---|---|---|---|
| 5,870,031 A * | 2/1999 | Kaiser | ............... | G06K 19/0723 327/104 |
| 6,373,790 B1 * | 4/2002 | Fujisawa | ................ | H02J 7/027 320/134 |
| 7,411,768 B2 * | 8/2008 | Sells | .................... | H02H 7/1255 307/127 |
| 2011/0075460 A1 * | 3/2011 | Sells | ...................... | H02M 1/08 363/127 |
| 2012/0242390 A1 * | 9/2012 | Montalbo | ............. | H02M 7/219 327/324 |
| 2013/0154492 A1 * | 6/2013 | Summerland | ........ | H02M 7/219 315/200 R |
| 2016/0043657 A1 * | 2/2016 | Mauder | ................ | H02M 7/217 363/127 |

\* cited by examiner

*Primary Examiner* — Alex Torres-Rivera
*Assistant Examiner* — Rafael O De Leon Domenech
(74) *Attorney, Agent, or Firm* — Wang Law Firm, Inc.

(57) ABSTRACT

A non-polar rectifying circuit includes two input terminals, two output terminals, two P-channel MOS transistors, and two N-channel MOS transistors. The two input terminals are respectively connected with a drain of one of the two P-channel MOS transistors and a drain of one of the two N-channel MOS transistors. One of the output terminals is electrically connected with the source of two P-channel MOS transistors, and the other output terminal is electrically connected with the source of two N-channel MOS transistors. In application, regardless of the two input terminals which is the positive polarity or negative polarity, one of the output terminals will output high level, and another will also output low level. As a result, it make the power plug no need to divide the positive and negative, which can reduce the installation time of LED lamps, especially for installing a large number of LED lightings.

3 Claims, 2 Drawing Sheets

NON-POLAR RECTIFYING CIRCUIT

RELATED APPLICATION

This present application claims benefit of the Chinese Application, CN201511029418.6, filed on Dec. 31, 2015.

BACKGROUND

1. Technical Field

The present application relates to lighting equipments, and more particularly to a non-polar rectifying circuit.

2. Description of the Related Art

Light emitting diode (LED) is growing in popularity due to decreasing costs and long life compared to incandescent lighting and fluorescent lighting. Recently, a number of LED lighting apparatuses have been designed to replace the halogen apparatus, as well as other traditional incandescent or fluorescence lighting apparatuses. In some places such as exhibition halls, jewelry stores, museums, supermarkets, and some home lighting, such as large villas, will use a lot of strip LED lamps. However, the installation of the strip LED lamps will give the user some unnecessary trouble. Because the current of LED chip must be DC, and the general power plug is divided into positive polar and negative polar, it will increase the installation time of a large number of strip LED lamps.

Therefore, it is necessary to provide a non-polar rectifying circuit which makes it possible to rapidly install the strip LED lamps.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
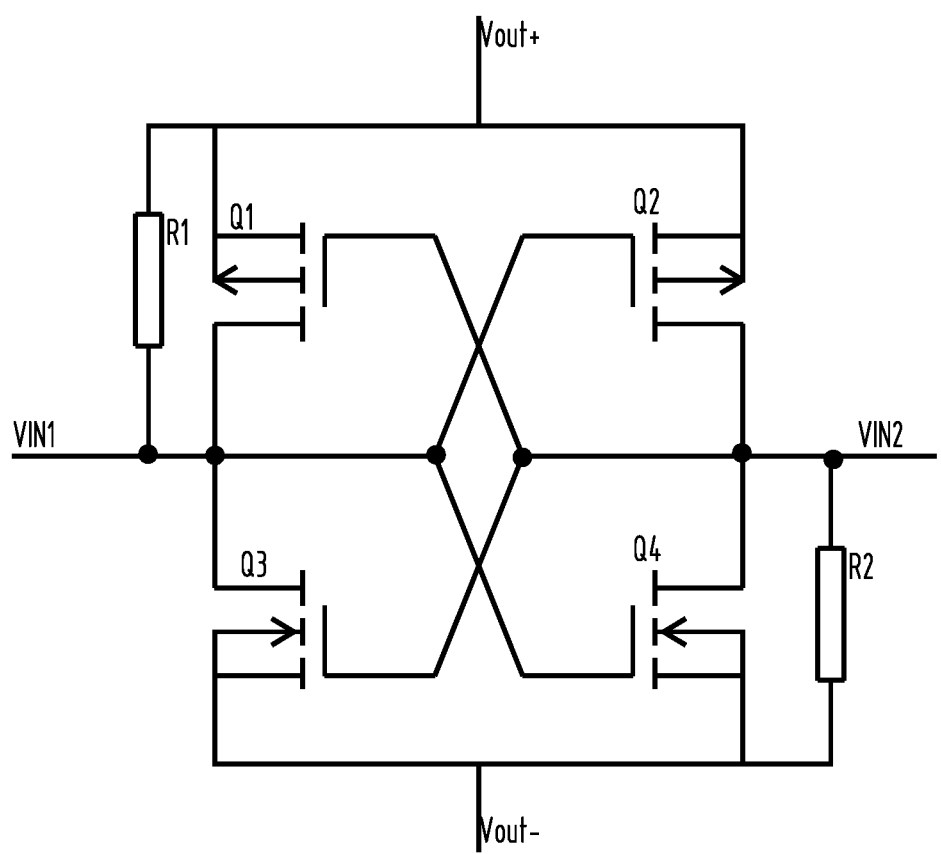
FIG. 1 is a circuit diagram of a non-polar rectifying circuit according to a first embodiment.

Referring to FIG. 1, a non-polar rectifying circuit 100 according to a first embodiment is shown. The non-polar rectifying circuit 100 includes two input terminals VIN1 and VIN2, two output terminals Vout+ and Vout−, two P-channel MOS transistors Q1 and Q2, and two N-channel MOS transistors Q3 and Q4. It will be understood that the above-mentioned electronic components such as a P-channel MOS transistors and an N-channel MOS transistors are conventionally known to those persons skilled in the art, such as the three-terminal polarity of the MOS transistors, the turn-on voltage, and no further explanation is needed.

the two input terminals VIN1 and VIN2 are electrically connected to the drain of one of the two P-channel MOS transistors and the drain of one of the two N-channel MOS transistors, respectively. In the present embodiment, the input terminal VIN1 is electrically connected to the drain of the P-channel MOS transistor Q1 and the drain of the N-channel MOS transistor Q3, and the input terminal VIN2 is electrically connected to the drain of the P-channel MOS transistor Q2 and the drain of the N-channel MOS transistor Q4. The input terminal VIN1 is also electrically connected to the source of the P-channel MOS transistor Q1, and a protection resistor R1 is provided between the input terminal VIN1 and the source of the P-channel MOS transistor Q1 to drain the parasitic inductance of the P-channel MOS transistor Q1. The input terminal VIN2 is electrically connected to the source of the N-channel MOS transistor Q3 and a protection resistor R2 is provided between the input terminal VIN2 and the source of the N-channel MOS transistor Q3 to drain the parasitic inductance of the N-channel MOS transistor Q3. In order to supply a threshold voltage to the P-channel MOS transistors Q1, Q2 and the N-channel MOS transistors Q3, Q4, the gate of one of the two P-channel MOS transistors Q1, Q2 and the gate of one of the N-channel MOS transistors Q3, Q4 are electrically connected t to one of the two input terminal, and the gate of the other of the two P-channel MOS transistors Q1, Q2 and the gate of the other of the two N-channel MOS transistors Q3, Q4 is electrically connected to another input terminal. In the present embodiment, the gates of the P-channel MOS transistor Q2 and the N-channel MOS transistor Q4 are electrically connected to the input terminal VIN1, and the gates of the P-channel MOS transistor Q1 and the N-channel MOS transistor Q are electrically connected to the input terminal VIN2.

One of the output terminals Vout+, Vout− is electrically connected to the sources of the two P-channel MOS transistors Q1, Q2 and another is electrically connected to the sources of the two N-channel MOS transistors Q3, Q4. In the present embodiment, the output terminal Vout+ is electrically connected to the sources of the two P-channel MOS transistors Q1, Q2 and the output terminal Vout− is electrically connected to the sources of the two N-channel MOS transistors Q3, Q4.

In application, when the maximum VGS voltage of the two P-channel MOS transistors Q1, Q2 and the two N-channel MOS transistors Q3, Q4 is larger than the input voltage of the input terminals VIN1 and VIN2, and the input terminal VIN1 is a positive input and the input terminal VIN2 is a negative VIN2, the P-channel MOS transistor Q1 and the N-channel MOS transistor Q4 are turned on, and the P-Channel MOS transistor Q2 and the N-channel MOS transistor Q3 is turned off so that the output terminal Vout+ outputs high level and the output terminal Vout− outputs low level. When the positive is the input terminal VIN2, the negative is the input terminal VIN1, the P-channel MOS transistor Q1 and the N-channel MOS transistor Q4 are turned off, and the P-Channel MOS transistor Q2 and the N-channel MOS transistor Q3 is turned on so that the output terminal Vout+ outputs high level and the output terminal Vout− outputs low level. Therefore, regardless of the two input terminals VIN1 and VIN2 which is the positive polarity or negative polarity, the output terminal Vout+ will output high level, and the output terminal Vout− will also output low level. As a result, it make the power plug no need to divide the positive and negative, which can reduce the installation time of LED lamps, especially for installing a large number of LED lightings.

Figure 2:
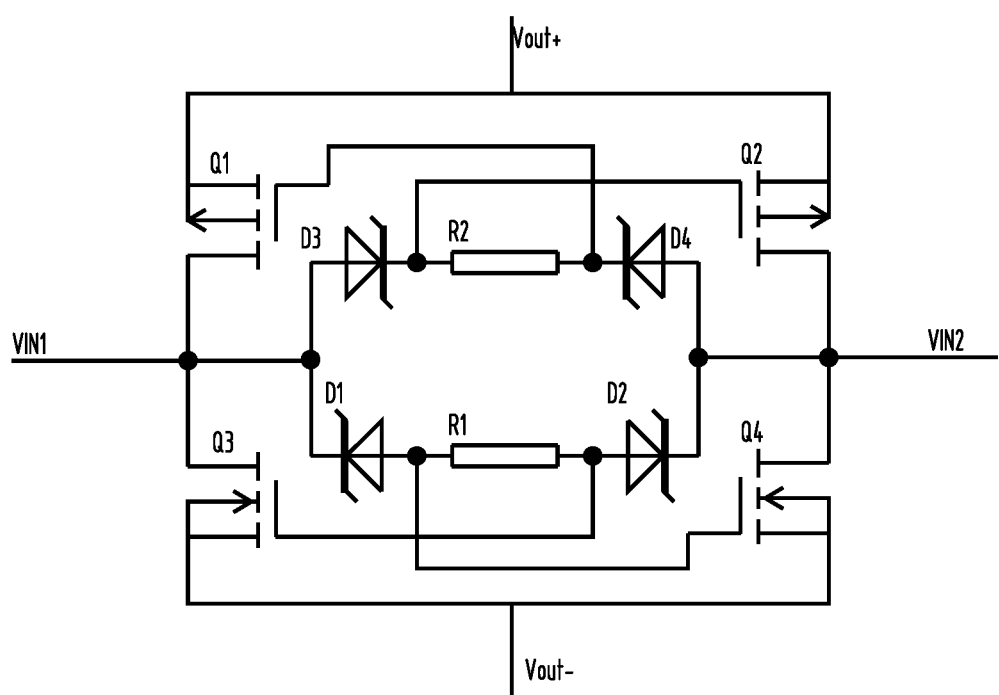
FIG. 2 is a circuit diagram of a non-polar rectifying circuit according to a second embodiment.

Referring to FIG. 2, a non-polar rectifier circuit 200 according to a second embodiment is shown. The non-polar rectifier circuit 200 includes two input terminals VIN1 and VIN2, two output terminals Vout+ and Vout−, two P-channel MOS transistors Q1, Q2, and two N-channel MOS transistors Q3, Q4.

The second embodiment is different from the first embodiment in that the circuit of the first embodiment is different from that of the second embodiment. When the maximum VGS voltage of the two P-channel MOS transistors Q1, Q2 and the two N-channel MOS transistors Q3, Q4 is larger than the input voltage of the input terminals VIN1 and VIN2, the circuit of the first embodiment is adapted. And when the maximum VGS voltage of the two P-channel MOS transistors Q1, Q2 and the two N-channel MOS transistors Q3, Q4 is less than the input voltage of the input terminals VIN1 and VIN2, the circuit of the second embodiment is adapted.

The two output terminals Vout+, Vout− and the two input terminals VIN1, VIN2 of the second embodiment are the same as the connection method of the source and the drain of the four MOS transistors except that the connection method among the two input terminals VIN1, VIN2 and the gates of four MOS transistors.

One of the two input terminals VIN1, VIN2 is electrically connected to the gates of the two P-channel MOS transistors Q1, Q2 by two regulators respectively, wherein the anode of one of the two regulators is electrically connected to one of the two input terminals VIN1, VIN2, the cathode of another regulator is electrically connected to another input terminals. The other input terminal is electrically connected to the gates of the two N-channel MOS transistors Q3, Q4 by two regulators respectively, wherein the anode of one of the two regulators is electrically connected to the input terminals, the cathode is electrically connected to the gate of the N-channel MOS transistor, and the cathode of another regulator is electrically connected to the input terminals, the anode thereof is electrically connected to the gate of the N-channel MOS transistor. In the present embodiment, the input terminals VIN1 is electrically connected to the gates of the two N-channel MOS transistors Q3, Q4 by the two regulators D1, D3, wherein the anode of the regulator D1 is electrically connected to the input terminals VIN1, the cathode of the regulator D1 is electrically connected to the gate of the N-channel MOS transistor Q4. And the anode of the regulator D3 is electrically connected to the input terminals VIN1, the cathode of the regulator D3 is electrically connected to the gate of the N-channel MOS transistor Q4. The input terminal VIN2 is electrically connected to the two P-channel MOS transistors Q1, Q2 by two regulators D2, D4, wherein the cathode of the regulator D2 is electrically connected to the input terminal VIN2, the anode of the regulator D2 is electrically connected to the gate of the P-channel MOS transistor Q1. And the anode of the regulator D4 is electrically connected to the input terminal VIN2, the cathode of the regulator D4 is electrically connected to the gate of the P-channel MOS transistor Q2. The voltage value of the for MOS transistors Q1, Q2, Q3, Q4 is regulated by the regulators D1, D2, D3, D4 to limit the input voltage value of the four MOS transistor Q1, Q2, Q3, Q4 so as not to exceed the maximum VGS voltage. Therefore, the regulated voltage value of the regulators D1, D2, D3, D4 should be larger than difference between the input voltage value of the input terminals VIN1, VIN2 and the threshold voltage value of the P-channel or N-channel MOS transistors Q1, Q2, Q3, Q4.

In addition, the gate of one of the two P-channel MOS transistor is electrically connected to that of one of the two N-channel MOS transistor via a protection resistor. The gate of another P-channel MOS transistor is electrically connected to that of another N-channel MOS transistor via another protection resistor. In the present embodiment, a protection resistor R3 is provided between the gate of the P-channel MOS transistor Q1 and the gate of the N-channel MOS transistor Q4, and a protection resistor R4 is arranged between the gate of the P-channel MOS transistor Q2 and the N-channel MOS transistor Q3.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-polar rectifying circuit, comprising: a first input terminal; a second input terminal; a first output terminal; a second output terminal; a first P-channel MOS transistor; a second P-channel MOS transistor; a first N-channel MOS transistor; a second N-channel MOS transistor, and the first input terminal is connected with a drain of the first P-channel MOS transistor and a drain of the first N-channel MOS transistor, the second input terminal is connected with a drain of the second P-channel MOS transistor and a drain of the second N-channel MOS transistor, the first output terminal is electrically connected with the sources of the first and second P-channel MOS transistors, the second output terminal is electrically connected with the sources of the first and second N-channel MOS transistors; wherein the second input terminal is electrically connected to a gate of the first P-channel MOS transistor by a fourth regulator, wherein an anode of the fourth regulator is electrically connected to the second input terminal, a cathode of the fourth regulator is connected to the gate of the first P-channel MOS transistor, and the first input terminal is electrically connected to a gate of the second P-channel MOS transistor by a third regulator, an anode of the third regulator is electrically connected to the first input terminal, a cathode of the third regulator is electrically connected to the gate of the second P-channel MOS transistor; wherein the first input terminal is electrically connected to a gate of the second N-channel MOS transistor by a first regulator, wherein a cathode of first regulator is electrically connected to the first input terminal, an anode of the first regulator is electrically connected to the gate of the second N-channel MOS transistor, and the second input terminal is electrically connected to a gate of the first N-channel MOS transistor by a second regulator, a cathode of the second regulator is electrically connected to the second input terminal, an anode of the second regulator is electrically connected with the gate of the first N-channel MOS transistor; wherein the cathodes of the third regulator and the fourth regulator are electrically connected through a second protection resistor and anodes of the first regulator and the second regulator are electrically connected through a first protection resistor.

2. The non-polar rectifying circuit as claimed in claim 1, wherein a voltage regulation value of all regulators is greater than a difference between an input value of the input terminal and a threshold voltage value of the P-channel or N-channel MOS transistors.

3. The non-polar rectifying circuit as claimed in claim 1, wherein the gate of the first P-channel MOS transistor is electrically connected to the gate of the gate of the second P-channel MOS transistor by the second protection resistor, the gate of the first N-channel MOS transistor is electrically connected to the gate of the second N-channel MOS transistor by the first protection resistor.

* * * * *